# 2,946,819

PROCESS OF PRODUCING CARBODIIMIDES

Robert F. Coles, North St. Paul, Minn., assignor to General Aniline & Film Corporation, New York, N.Y., a corporation of Delaware No Drawing. Filed Apr. 14, 1958, Ser. No. 728,087

4 Claims. (Cl. 260—551)

This invention relates to carbodiimides and a process for preparing them.

Carbodiimides are known chemical compounds and are useful intermediates in the chemical field and related arts. Carbodiimides have been found particularly valuable in the realm of photography where they are used to prepare modified gelatins and in this connection reference is made to my co-pending application, Serial No. 609,529, filed September 13, 1956, now abandoned.

It is known to prepare carbodiimides by treating N,N'-disubstituted thioureas with heavy metal oxides or carbonates such as mercuric oxide (HgO), lead oxide (PbO), lead carbonate ($PbCO_3$), and the like. In the ensuing reaction, the elements of hydrogen sulfide are abstracted from the thiourea resulting in formation of the corresponding carbodiimides. A serious drawback, however, to the above described process can be attributed to the inconsistent results that are often obtained. In some instances, the yield of carbodiimide may be quite high while at other times very little reaction occurs at all. It is generally conceded that the action of the aforesaid heavy metal compound on N,N'-disubstituted thioureas, wherein the elements hydrogen sulfide are abstracted, is a surface phenomenon occurring at a reactive surface. If the reactive surface of the heavy metal compounds is deactivated before complete desulfurization of the thioureas is complete, such as the deposition of a metal sulfide as a coating over the heavy metal compounds, then the rate of desulfurization is retarded and the yields of carbodiimides correspondingly low. In addition, it is difficult to procure or obtain the heavy metal compounds which always possess the same degree of surface activity so that one obtains high yields of a particular carbodiimide in one instance while the same carbodiimide may be obtained in low yields at another time using a different source or mode of preparation of the heavy metal compounds.

It is, therefore, believed to be evident that a need exists in the art for the production of carbodiimides in higher yields and with greater reliability and a provision of such a process constitutes the object and purpose of the present invention.

It has now been discovered that carbodiimides can be produced in higher yields and with greater dependability by reacting N,N'-disubstituted thioureas with a mercury complex in the presence of a water soluble inorganic base such as KOH, NaOH, LiOH, etc. The reaction comprises two steps, (1) formation of the mercury complex, (2) treatment of the N,N'-disubstituted thiourea with the said mercury complex as shown in the following equations:

$$HgO + 4KI \xrightarrow{H_2O} K_2HgI_4 + 2KOH$$

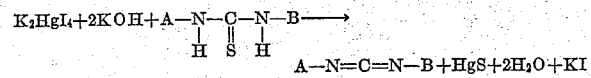

$$A-N=C=N-B + HgS + 2H_2O + KI$$

The mercury complex or mercuric potassium iodide shown in the equation is a known compound in the chemical art and is sometimes referred to as Meyer's reagent (c. "Hackh's Chemical Dictionary," by Grant, third edition, pp. 524–525).

Since potassium iodide is formed as a by-product of the above reaction, this latter compound can be used in less than the required amount to complex an equivalent of mercuric oxide. It is to be noted that mercuric chloride can be used in lieu of mercuric oxide in which case potassium hydroxide must be added to the reaction since the formation of carbodiimides, as above described, requires the presence of alkali.

The N,N'-disubstituted carbodiimides prepared in accordance with the present invention can be represented by the following general formula:

$$A-N=C=N-B$$

wherein A and B, which may be alike or different, represent organic radicals such as an aliphatic radical, i.e., alkyl, e.g., methyl, ethyl, propyl, isopropyl, n-butyl, isobutyl, tert.-butyl, allyl, crotyl, β-hydroxyethyl, γ-dimethylaminopropyl, β-bromoallyl, and the like; an alicyclic radical, e.g., cyclopropyl, cyclobutyl, cyclopentyl, cyclohexyl, cycloheptyl, cyclooctyl, cyclononyl, cyclodecyl, and the like.

The N,N'-disubstituted thioureas used as intermediates for the preparation of carbodiimides as herein described can be represented by the following general formula:

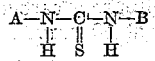

wherein A and B have the values given above.

In the following list are typified N,N'-disubstituted thioureas which may be employed for the purpose herein set forth:

N-methyl-N'-tert.-butylthiourea
N,N'-diisopropylthiourea
N,N'-dicyclohexylthiourea
N,N'-ditert.-butylthiourea
N-cyclohexyl-N'-tert.-butylthiourea
N,N'-dibutylthiourea
N,N'-diisobutylthiourea
N-allyl-N'-propylthiourea
N,N'-diallylthiourea
N-allyl-N'-cyclohexylthiourea
N-crotyl-N'-cyclohexylthiourea
N-allyl-N'-(β-hydroxyethyl)thiourea
N-methyl-N'-propylthiourea
N-propyl-N'-tert.-butylthiourea
N-isopropyl-N'-tert.-butylthiourea
N-(γ-dimethylaminopropyl)-N'-tert.-butylthiourea
N-(β-bromoallyl)-N'-propylthiourea
N-(β-bromoallyl)-N'-isopropylthiourea
N-(β-bromoallyl)-N'-tert.-butylthiourea
N-(γ-dimethylaminopropyl)-N'-(β-bromoallyl)thiourea Of the carbodiimides which can be prepared from the aforesaid disubstituted thioureas, the following list is typical:

N-methyl-N'-tert.-butylcarbodiimide
N,N'-diisopropylcarbodiimide
N,N'-dicyclohexylcarbodiimide
N,N'-ditert.-butylcarbodiimide
N-cyclohexyl-N'-tert.-butylcarbodiimide
N,N'-dibutylcarbodiimide
N,N'-diisobutylcarbodiimide
N-allyl-N'-propylcarbodiimide
N,N'-diallylcarbodiimide
N-allyl-N'-cyclohexylcarbodiimide
N-crotyl-N'-cyclohexylcarbodiimide
N-allyl-N'-(β-hydroxyethyl)carbodiimide
N-methyl-N'-propylcarbodiimide N-propyl-N'-tert.-butylcarbodiimide
N-isopropyl-N'-tert.-butylcarbodiimide
N-(γ-dimethylaminopropyl)-N'-tert.-butylcarbodiimide
N-(β-bromoallyl)-N'-propylcarbodiimide
N-(β-bromoallyl)-N'-isopropylcarbodiimide
N-(β-bromoallyl)-N'-tert.-butylcarbodiimide
N - (γ-dimethylaminopropyl)-N'-(β-bromoallyl)carbodiimide The invention is illustrated in greater detail by the following specific examples but it is to be understood that such examples are illustrative only and are not to be taken as imposing any limitation on the invention.

EXAMPLE I

*N,N'-dicyclohexylcarbodiimide*

In a 2-liter, 3-necked flask, equipped with a stirrer and condenser was placed a solution of potassium iodide (332 g., 2 mol) in 1-liter of warm water and then (135.7 g., 0.5 mol) of mercuric chloride. As soon as the solution was complete, potassium hydroxide (57 g., 1.0 mol was added. The resulting solution was treated with N,N'-dicyclohexylthiourea (120 g., 0.5 mol). The suspension was heated at reflux for 4 hours. The mercuric sulfide was removed by filtration and washed well with petroleum ether (B.P. 30–60° C.). The organic layer was separated, dried and distilled at reduced pressure. Yield 72.5 g., 70%, B.P. 154–155° C./11 mm.

EXAMPLE II

The same procedure was employed as given above for Example I except that N,N'-diisopropylthiourea was used. The N,N'-diisopropylcarbodiimide so obtained boiled at 36–37° C., at 10 mm.

I claim:

1. A process of producing a carbodiimide of the following general formula:

A—N=C=N—B wherein A and B are selected from the class consisting of lower alkyl, lower cycloalkyl and phenyl which comprises reacting about 1 mole of a N,N'-disubstituted thiourea of the following general formula:

$$\begin{array}{c} A-N-C-N-B \\ | \ \| \ | \\ H \ S \ H \end{array}$$

wherein A and B are selected from the class consisting of lower alkyl, lower cycloalkyl and phenyl with about 1 mole of mercuric potassium iodide and about 2 moles of an alkali metal hydroxide in an aqueous medium and separating the carbodiimide formed from said aqueous medium.

2. A process as defined in claim 1 wherein the alkali metal hydroxide is potassium hydroxide.

3. A process of producing N,N'-dicyclohexyl carbodiimide which comprises refluxing in aqueous medium about 1 mole of N,N'-dicyclohexylthiourea with about 2 moles of sodium hydroxide and 1 mole of mercuric potassium iodide, separating the oily liquid formed from said aqueous solute medium and recovering the pure N,N'-dicyclohexyl carbodiimide by distillation.

4. A process of producing N,N'-diisopropyl carbodiimide which comprises refluxing in aqueous medium about 1 mole of N,N'-diisopropylthiourea with about 2 moles of sodium hydroxide and 1 mole of mercuric potassium iodide, separating the other liquid formed from said aqueous solute medium and recovering the pure N,N'-diisopropyl carbodiimide by distillation.

References Cited in the file of this patent

UNITED STATES PATENTS

| | | |
|---|---|---|
| 2,415,043 | Rust | Jan. 28, 1947 |
| 2,656,383 | Schmidt et al. | Oct. 20, 1953 |

FOREIGN PATENTS

| | | |
|---|---|---|
| 708,678 | Germany | July 29, 1951 |
| 924,751 | Germany | Mar. 7, 1955 |